United States Patent [19]

Schapink

[11] 4,181,016

[45] Jan. 1, 1980

[54] PROCESS AND APPARATUS FOR TESTING HYDRAULIC CONTROL SYSTEMS

[75] Inventor: Walter Schapink, BA Bussum, Netherlands

[73] Assignee: Sun Electric Corporation, Crystal Lake, Ill.

[21] Appl. No.: 923,567

[22] Filed: Jul. 11, 1978

[30] Foreign Application Priority Data

Jul. 11, 1977 [NL] Netherlands ........................ 7707711

[51] Int. Cl.[2] ........................................ G01M 19/00

[52] U.S. Cl. ........................................ 73/168

[58] Field of Search ........................................ 73/168, 37

[56] References Cited

U.S. PATENT DOCUMENTS

| | | | |
|---|---|---|---|
| 2,478,938 | 8/1949 | Osterhus | 73/168 X |
| 2,612,777 | 10/1952 | Greer | 73/168 |
| 3,230,761 | 1/1966 | Sanders | 73/168 X |

FOREIGN PATENT DOCUMENTS

| | | | |
|---|---|---|---|
| 770452 | 3/1957 | United Kingdom | 73/168 |
| 248308 | 7/1969 | U.S.S.R. | 73/168 |

*Primary Examiner*—Gerald Goldberg

*Assistant Examiner*—Joseph W. Roskos

*Attorney, Agent, or Firm*—Allegretti, Newitt, Witcoff & McAndrews

[57] ABSTRACT

A method and apparatus for simultaneous testing of one or more hydraulic control systems, each system having a hydraulic pressure pump whose high-pressure end is connected to a first tank in which a first piston element having a relatively small surface is movable and whose low-pressure end is connected to a second tank in which a second sealing element, which has a relatively large surface and is coupled with the first piston element, is movable in such a way that under normal working conditions a constant compression ratio is maintained in the system and each individual system includes at least one working unit between the high-pressure end and the low pressure end while, for use on a test unit with a pressure pump of its own, its high-pressure end is connected to the high-pressure end of each system to be tested and the low-pressure end is connected by way of a tank to the low-pressure end of each system to be tested, at least one pressure regulator for each system being inserted between the tank to the test system and the low-pressure end to be tested; and having pressure regulator in dependence of the position of the corresponding piston elements coupled with each other to maintain the compression ratio in each individual system, which is to be tested, at the value conforming to normal working conditions.

7 Claims, 1 Drawing Figure

PROCESS AND APPARATUS FOR TESTING HYDRAULIC CONTROL SYSTEMS

BACKGROUND OF THE INVENTION

The invention relates to a method and apparatus for testing one hydraulic control system or, if desired, more than one control system simultaneously. Each control system is provided with a hydraulic pressure pump whose high-pressure end is connected to a first tank in which a first movable sealing element, such as a piston having a relatively small surface, is movable and whose low-pressure end is connected to a second tank in which a second sealing element, which has a relatively large surface and is coupled with the first sealing element, is movable. This takes place in such a way that, under normal working conditions, a constant compression ratio is maintained in the system. Each individual system has at least one load unit or consuming unit between the high-pressure end and the low-pressure end, or the systems are connected with a test unit that has its own pressure pump—namely the high-pressure end of the test unit is connected to the high pressure end of each system to be tested and the low-pressure end of the test unit is connected by way of a tank to the low-pressure end of the system to be tested.

In each airplane, for instance, there are several hydraulic systems which must be examined and tested regularly. The hydraulic pumps of these systems are normally driven by airplane motors. But because that motor does not run during the testing, the test unit is provided with its own pump.

As described above, the testing of hydraulic control systems is carried out in a so-called "open loop". In this procedure, the tank of the test unit is preferably under vacuum whereby the tanks of the hydraulic systems connected to the low-pressure end run empty. As a result, the normal compression ratio after the coupling of the test tank, in which a pressure lower than in agreement with normal operating conditions prevails, is disturbed. The sealing elements, as for instance, in form of pistons, which are present in these tanks and are coupled with each other, are then all in the same low end position.

Testing, according to this method, has the advantage that the hydraulic fluid can be de-aerated during testing because the test tank is under vacuum and that several control systems can be tested simultaneously with the help of a single test pump and that the hydraulic fluid can be changed. However, the disadvantage of the method lies in the fact that during the testing of the connected load units, as for instance, servo valves, no pressure difference exists between the low-pressure end and the high-pressure end of the system. These essential construction elements therefore cannot be simultaneously tested by this method. Also, the tanks of the control systems must be filled again after testing.

The present invention makes available a method and a device by means of which the disadvantages mentioned above are avoided.

SUMMARY OF THE INVENTION

As defined in the present invention, these advantages can be achieved by maintaining in each system to be tested the compression ratio at a value, that agrees with normal working conditions, in dependence of the position of the respective coupled piston elements by way of one or several pressure regulators which are present in the connection between the tank of the test unit and the low-pressure end of each system to be tested.

A control signal present in the system to be tested and representing the position of the respective coupled piston elements is preferably used for the automatic control of the pressure regulator. It can be an electrical, pneumatic, hydraulic or mechanical signal.

By the application of the method and of the apparatus as defined by the present invention, the compression ratio of each individual system to be tested is maintained at the normal value—independent of each other—whereby the hydraulic fluid is de-aerated.

It should be noted that the testing of, for instance, servo valves with a normal compression ratio in the system is known per se, for instance, in the so-called "closed loop" method.

In this method, the low-pressure end of the system to be tested is connected directly to the low-pressure end of the pump and of the test unit. In this case, the tank of the test unit is therefore not included in the test circulation. The high-pressure end of the test pump is, as usual, again connected on the high-pressure end of the system to be tested. This closed loop has the disadvantage that several systems cannot be tested simultaneously by means of a single pump. This is to be traced back to the fact that the low-pressure lines, which run from the point of connection to the test unit up to their respective tanks, have different resistances to flow.

With a certain flow-through of hydraulic fluid, a different pressure will prevail on the low-pressure end of each individual tank whereby the piston positions become undetermined and the tanks can overflow. With the closed loop, the control systems are thus to be tested only individually one after the other—except if several expensive test pumps per test unit are available causing high investment costs. Since the tank, which is possibly under vacuum, is not connected in the closed loop, the hydraulic fluid is not de-aerated and changed during testing. This must be carried out separately.

Since, with the employment of the novel testing method and apparatus as defined in the invention, the compression ratios of the connected systems are maintained independent of each other and thus cannot influence each other, several systems—each by way of a pressure regulator of its own—are connected parallel to a test pump and are tested simultaneously while the hydraulic fluid can be de-aerated and changed simultaneously.

BRIEF DESCRIPTION OF THE DRAWING

Further details, characteristics and advantages are evident from the following description and the enclosed drawing which is a schematic diagram of a preferred embodiment of hydraulic control system embodying the invention.

DESCRIPTION OF THE PREFERRED EMBODIMENT

Figure 1:
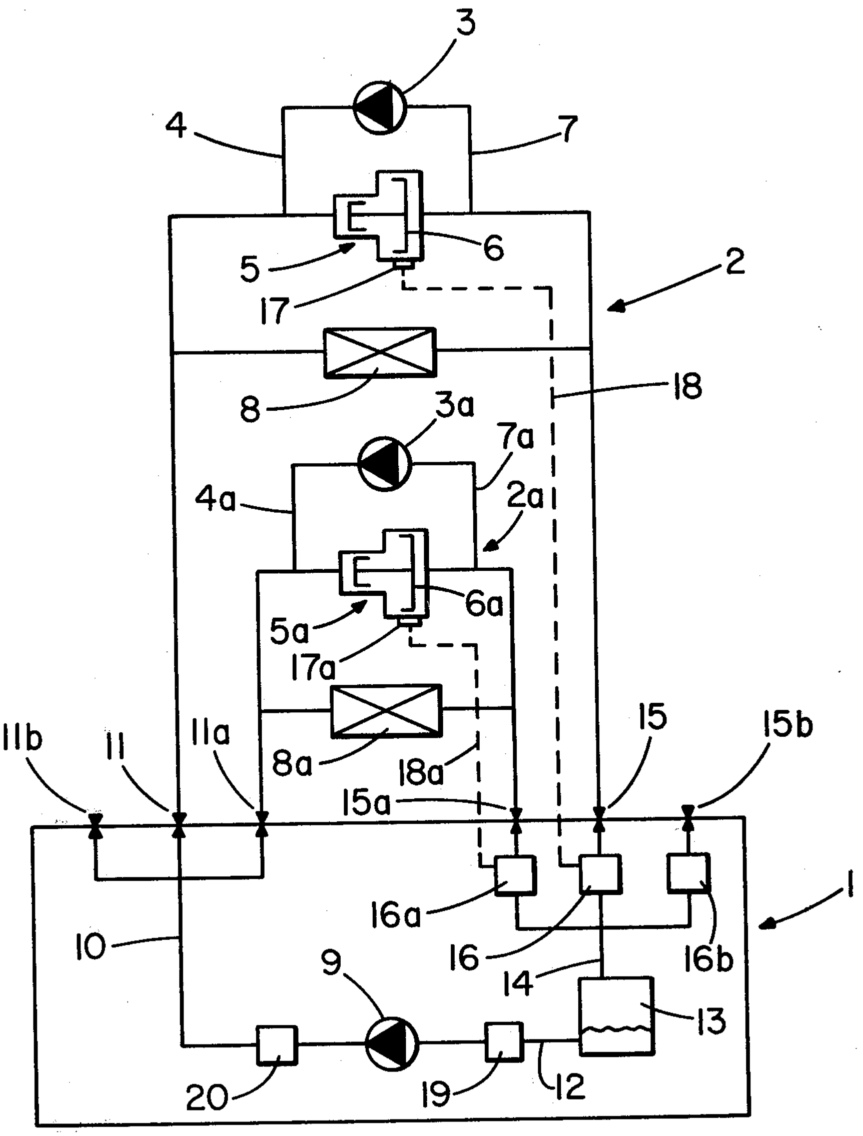

Two hydraulic control systems are connected to a test unit 1. Each individual system includes a hydraulic pressure pump 3, 3*a*, whose high-pressure end 4, 4*a* is respectively connected with the high-pressure end of a tank 5, 5*a*, of a so-called "piston pressure tank". In each individual tank 5, 5*a*, of this type there are two coupled pistons 6, 6*a*, which have different diameters and can move jointly in the tank parallel to the axis. The low-pressure end 7, 7*a*, of each individual pump is respectively connected with the low-pressure end of the corresponding tank 5, 5a; this is that end in which the piston having the larger diameter moves. Between the high-pressure end and the low-pressure end of each individual control system there is connected at least one consuming unit or one unit of work 8, 8a, for instance, hydraulic cylinders or servo valves or other units as they just happen.

The test unit 1 has its own pressure pump 9 whose high-pressure end can be connected, by way of a line 10 and connection points 11, 11a, 11b, to the high-pressure end of the systems to be tested. The low-pressure end of pump 9 is connected, by way of line 14 and connection points 15, 15a, 15b, with the low-pressure end of the system to be tested. Between each connection point and the tank 13 there is arranged one pressure regulator 16, 16a, 16b respectively. These pressure regulators 16, 16a, 16b are controlled each by a sensor 17, 17a which is arranged on each individual system tank 5, 5a, determines the position of the coupled pistons 6, 6a and is connected by way of a line 18, 18a each to the pertaining pressure regulator. In the illustrated embodiment, three sets of connection points are present. It will be understood by those skilled in the art that this number can be selected as desired.

In the connection lines 10 and 12 of the test unit there are also present filters 19 and cooling devices 20. The pressure regulators 16, 16a, 16b consist preferably of controllable valves which are controlled in dependence of the corresponding sensor signal which corresponds to the position of the respective piston in the "piston" tank.

The sensor can have any design. For instance, simple limit switches which indicate the extreme desired work positions of the pistons are sufficient. But other sensors can also be used, for instance, those which indicate a continuously changeable signal as the function of the position of the piston. A usable signal can also be derived from existing position indicators, for instance, inductively.

The operation of the invention is as follows:

The control systems to be tested are connected to the test unit as indicated in the drawing. Pump 9 of the test unit takes care of the required test pressure while the airplane pumps 3, 3a are out of action. The system tanks 5, 5a determine a constant compression ratio between the high-pressure ends and the low-pressure ends of the systems to be tested. During the testing, a quantity of hydraulic fluid flows from the high-pressure end to the low-pressure end by way of the consuming units or working units 8, 8a. Consequently, the pressure in the low-pressure lines increases whereby tanks 5, 5a are filled and pistons 6, 6a (in the drawing) move to the left. In order to prevent the tank from overflowing, a certain position of the coupled pistons is maintained in each system by way of sensors 17, 17a and line 18, 18a which give a signal to the pressure regulator 16, 16a. The valve present in the pressure regulator opens whereby the pressure in the low-pressure line drops and the piston 6, 6a again moves to the right until a desired position is reached.

The hydraulic fluid flows from the pressure regulator into the tank 13 of the test unit. This tank can be under vacuum whereby the hydraulic fluid is de-aerated. Behind the tank, the fluid is pumped into the control system by way of filter 19 and the cooling device 20 and the connection points 11, 11a, 11b to the high-pressure side.

In this manner it is therefore possible to maintain a certain compression ratio in the systems while the pressure in the test tank has no influence thereon.

Those skilled in the art will appreciate that the invention as described above is merely exemplary of a preferred embodiment of the invention, and that modifications can be made without departing from the spirit and scope of the invention as defined by the appended claims.

What is claimed is:

1. Apparatus for the simultaneous testing of one or more hydraulic control systems, each system having a hydraulic pressure pump whose high-pressure end is connected to a first tank in which a piston element having a relatively small surface is movable and whose low-pressure end connected to a second tank in which a sealing element, which has a relatively large surface and is coupled with the piston element, is movable in such a way that under normal working conditions a constant compression ratio is maintained in the system, each individual system including at least one working unit between the high-pressure end and the low pressure end while, for use on a test unit with a pressure pump of its own, its high-pressure end is connected to the high-pressure end of each system to be tested and the low-pressure end is connected by way of a tank to the low-pressure end of each system to be tested, at least one pressure regulator for each system connected between the tank in the test system and the low-pressure end to be tested; said pressure regulator acting in dependence of the position of the corresponding piston elements coupled with each other to maintain the compression ratio in each individual system at the value conforming to normal working conditions.

2. Apparatus as defined in claim 1 wherein for the automatic control there is obtained a control signal which is present in the system to be tested and which represents the position of the corresponding couples piston elements.

3. Apparatus as defined in claim 2, wherein an electrical signal is used.

4. Apparatus as defined in claim 2, wherein a pneumatic signal is used.

5. Apparatus as defined in claim 2, wherein a hydraulic signal is used.

6. Apparatus as defined in claim 2, wherein a mechanical signal is used.

7. Apparatus for the simultaneous testing of one or more hydraulic control systems comprising a hydraulic pressure pump which at the high-pressure end is connected by way of common connection points to the hydraulic system or systems to be tested and on the low-pressure end to a tank which itself is connected to at least one connection point for the low-pressure end of the hydraulic system to be tested, where in the connection between the tank and each individual connection point for a system to be tested there is inserted a pressure regulator in order to maintain the normal compression ratio in each individual system to be tested; and whereby for the control of each individual pressure regulator, a control factor may be derived from the position of the coupled piston elements in the pertaining system to be tested.

* * * * *